March 20, 1934.     E. J. SIEGLER ET AL     1,951,777
DEVICE FOR PRESERVING FLOWERS IN FLORAL SPRAYS
Filed April 1, 1932

Edwin J. Siegler
William Gear, Jr.
    INVENTORS

BY   *Murray & Zugelter*
            ATTORNEYS

UNITED STATES PATENT OFFICE 1,951,777

DEVICE FOR PRESERVING FLOWERS IN FLORAL SPRAYS

Edwin J. Siegler and William Gear, Jr., Cincinnati, Ohio

Application April 1, 1932, Serial No. 602,450

2 Claims. (Cl. 47—41)

The present invention relates to a means for application to the stems of flowers which are to be made up into floral sprays or similar arrangements wherein no vase or the like is used and it is either difficult or impossible to water the fresh cut flowers and has for its principal object the provision of a means which holds water under pressure upon the end and a portion of the stem of the cut flower and thus preserves the freshness of the flower for a long time.

Another object is to provide a device of this kind which is easy to apply and which is readily obscured by the foliage, smilax and other portions of the finished floral spray.

Another object is to provide a device of this kind that is inexpensive and which eliminates the loss of time and extra flowers occasioned by the practice of first-class florists in replacing withered flowers in the sprays after such sprays have remained in a funeral parlor for a day or so.

These and other objects are attained by the means and method hereinafter described and disclosed in the accompanying drawing, in which.

Figures 1, 2:
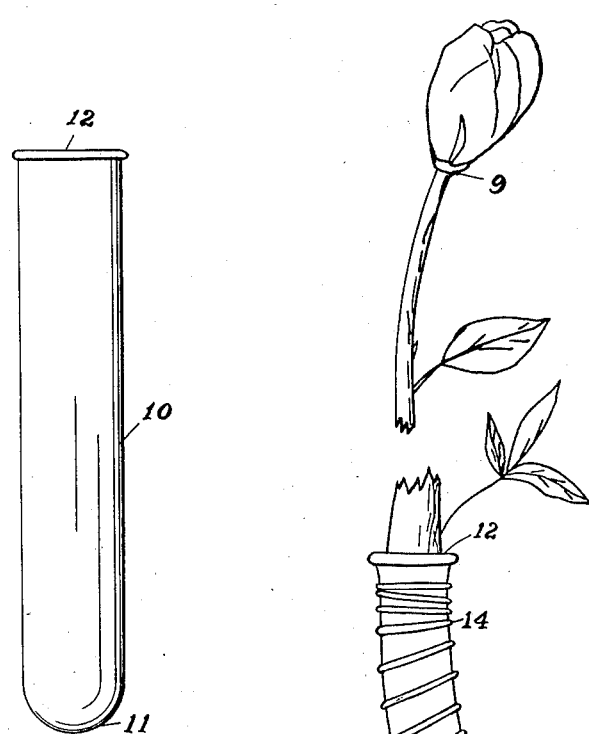
Fig. 1 is a cross sectional view of an elastic watertight vessel of the invention.
Fig. 2 is a fragmental view showing a flower bud, partly in enlarged proportions, with a device of the invention operatively mounted thereon.

The method and means of our invention provide for the retention of a small quantity of water at and about the bottom of the stem of each flower or of such flowers of a floral spray as are likely to wilt too rapidly when removed from water.

To the cut end 7 of a stem 8 of a bud or flower 9 is applied a flexible tube 10, preferably of rubber, the tubular member 10 having a closed bottom 11 and a mouth 12 to receive the water or preservative solution 13 and the stem 8. Then starting adjacent the mouth 12 of the tube 10 a piece of suitable material such as florists' soft binding wire 14 is wrapped tightly about the tube 12 and the stem 8 therein. As the winding of the wire or the like progresses to the lower end of the stem, a pressure is developed on the body of water 13 thus confined as may be noted by a distention of the unconfined bottom part of tube 10. The stems 8, it will be noted, are each retained in a body of water under pressure and the flower will stay fresh several days longer than otherwise.

The flowers thus prepared are then fabricated into a floral offering according to the fashion well known to florists, and the decorative foliage, fern, etc., as well as the foliage of the flowers themselves will conceal the water-containing tubes on the ends of the stems. The flowers and foliage of the particular floral piece or spray are wired in position to preclude displacement so that there is no likelihood of the flower freshening devices of the invention becoming conspicuous. By preference the water-holding tubes 10 are made of material of a suitable shade of green color thus making them non-contrasting with the predominant color of the foliage.

What is claimed is:

1. In a floral spray the combination of suitably grouped cut flowers and kindred materials and means for holding small amounts of liquid under pressure about the bottoms of the individual stems of said flowers, said means comprising an elastic container to hold water and receive the individual flower stem and a binding member wound tightly adjacent the top of the container and thence progressively tightly and downwardly and exerting pressure on the water and to distend the elastic container whereby pressure on the water is retained therein to force the water into the stem.

2. As a means for keeping a cut flower in a fresh state, a means for holding a small amount of liquid under pressure about the bottom of the stem of said flower, said means comprising an elastic container to hold liquid and receive the flower stem and a binding member wound tightly adjacent the top of the container and thence progressively tightly and downwardly and exerting pressure on the liquid and distending the elastic container whereby pressure on the liquid is retained therein to force the liquid into the stem.

EDWIN J. SIEGLER.
WILLIAM GEAR, Jr.